Nov. 30, 1943.    C. G. HAUSER ET AL    2,335,275
PROCESS OF TREATING MILK
Filed July 25, 1938

Inventors
C. G. Hauser
H. O. Bierbaum
H. J. Miller
By Mason Fenwick & Lawrence
Attorneys Patented Nov. 30, 1943

2,335,275

UNITED STATES PATENT OFFICE 2,335,275

PROCESS OF TREATING MILK

Charles G. Hauser, Henry Otto Bierbaum, and Harry J. Miller, Litchfield, Ill., assignors to Carolene Products Company, Litchfield, Ill., a corporation of Michigan Application July 25, 1938, Serial No. 221,090

5 Claims. (Cl. 99—63)

Our invention relates to milk food products and especially to processes of manufacturing the same.

An object being in our invention to provide a method of preparing a milk food product which will be fully equal if not superior in food value to whole or evaporated milk and to provide such a method as will make it wholly practical and economical to prepare a canned milk product possessing a uniform definite quantity of ingredients with the result that such milk food values are thus obtainable in the product of our process at all seasons of the year, with a wholesome quality in each ingredient and with the product of this process possessing a pleasant taste.

It is a well known fact that although a good quality of whole or evaporated milk, possessing the needed quantities of the various food values therein, is always a desirable food for people of all ages; yet because of a wide range of food qualities and protection for milk cows in various localities and also because of the difference in the various breeds of milk cows, the whole milk that is commonly purchased on the market will be found to vary considerably at different seasons of the year and under these varying conditions.

It is therefore true that available whole milk is not uniform in its food value, in that the vitamin content varies, depending upon the feed the cow gets.

In connection with our process of manufacturing milk food products, we find it desirable to separate a major portion of the butter fat in the whole milk, leaving skimmed milk, and this butter fat is utilized for making butter which is available to the public as food in that form, but we utilize this skimmed milk to start with in the preparation of a milk food product resulting from this process and a product which is a subject of a companion application for patent protection.

In the production of this product, of our novel method of preparing the same, we are able to provide the very best quality in every food ingredient that we utilize in preparing this milk food and the result is that we turn out a wholesome, healthful milk food product which has a pleasant taste.

We follow our process by utilizing a novel combination of mechanical means which is also the subject of a companion application for patent application.

We attain the objects of our process by the methods of procedure described in this specification and recited in the claims.

In a study of the drawing accompanying this specification, our novel process will be more readily comprehended for the reason that the drawing illustrates in a general way the novel combination of mechanical equipment which we utilize in accomplishing our process.

Figure 1:
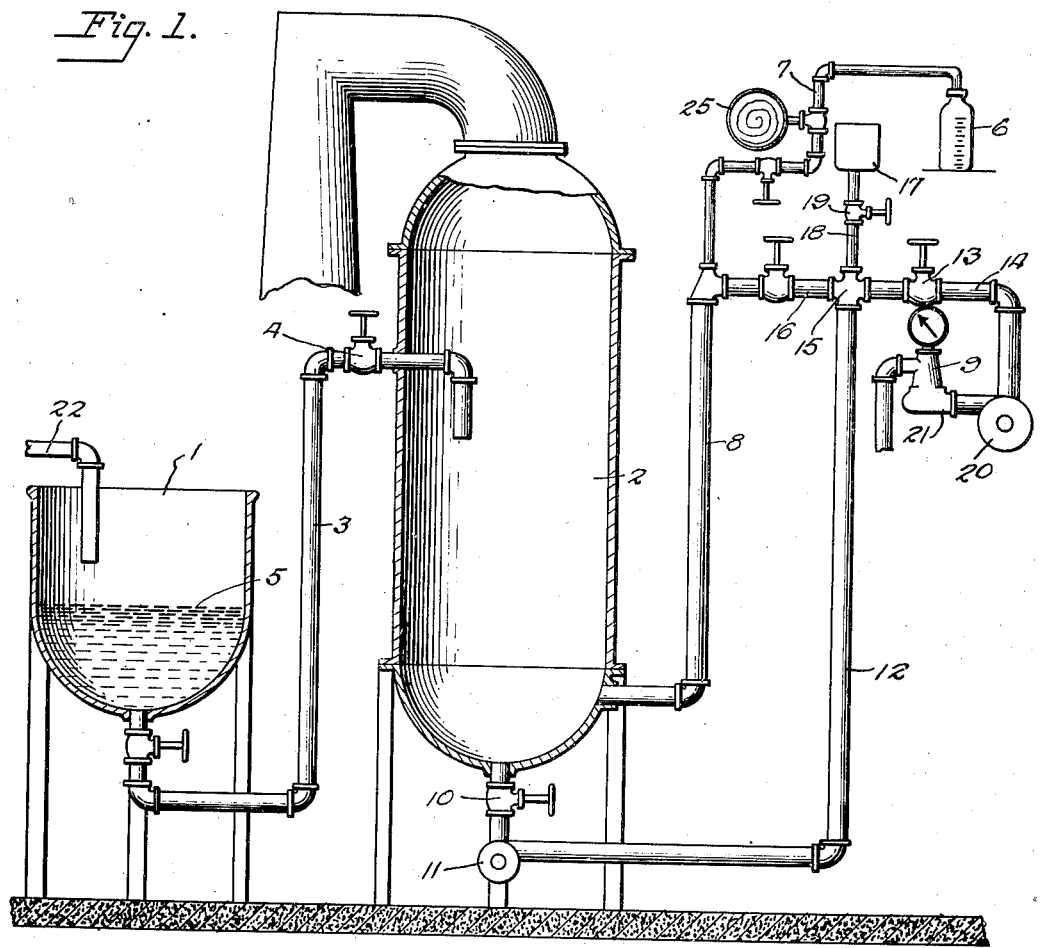
Fig. 1 is a vertical section through the several parts of our equipment.
Figure 2:
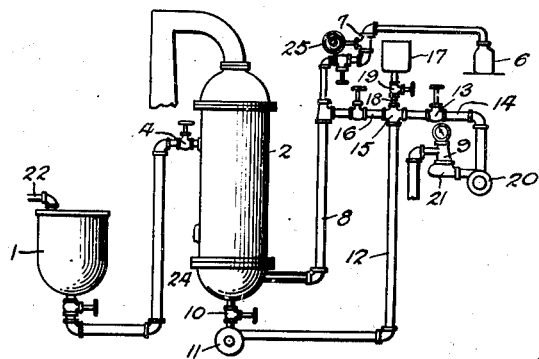
Fig. 2 is a side elevation of the equipment shown in Fig. 1.

Referring now in detail to the salient features of our method of preparing milk food products, we prefer to proceed as follows:

We start off with the features of our process by placing a desired quantity of skimmed milk into a hot well 1 and add to this selected quantity of skimmed milk a sufficient amount of non-vitamin bearing vegetable oil to provide a well-balanced milk food product, in every respect but certain essential vitamins that were removed from the original whole milk when the butter fat was extracted therefrom. These essential vitamins will be added later in our process.

To this combination of skimmed milk and vegetable oil, we apply heat to raise its temperature to approximately 210° F. and to agitate the mixture by releasing steam into the same.

A vigorous agitation of this mixture in a temperature of this degree will result in an emulsion of these ingredients.

As another essential step in our process, we provide a vacuum tank 2 communicatively connected with hot well 1 by a pipe 3 having a shut-off valve 4 and it is in this vacuum tank that we add to the emulsion such vitamins as are needed to replace the emulsion, the vitamins which may have been removed when extracting butter fat.

This vacuum tank is very essential to the successful operation of our process.

For instance, we prepare this vacuum tank for receiving the emulsion 5 in hot well 1 by creating a vacuum of approximately 26 inches in the tank and by heating the tank preferably with steam coils to a temperature of approximately 130° F.

Valve 4 is then opened and the vacuum in tank 2 forcefully and violently draws the emulsion 5 out of hot well 1 over into vacuum tank 2 and as this is done the emulsion enters tank 2 with a forceful blast which very violently agitates the entire volume of emulsion, not only as it enters, but after it is transferred thereto, as this emulsion enters tank 2 it comes with a boiling temperature suddenly into the vacuum tank having a temperature of approximately 130° F. and the result is a sudden liberation of the excessive heat units in the incoming emulsion.

During this forceful agitation of the emulsion in the vacuum tank, we enter into the mixture a sufficient quantity of vitamin A and D concentrate from its graduated container 6 from which this concentrate is drawn into the vacuum tank through tubes 7 and return pipe 8 by the force of the vacuum in the tank thus communicatively connected with container 6 through tube 7 and pipe 8.

After a desired quantity of the emulsion has been successfully agitated and mixed with the vitamin A and D concentrate within the vacuum tank 2, driving off the desired amount of water together with any undesirable flavors and odors commonly found in high potency vitamins A and D without any loss of the vitamins, we then start pumping this completed mixture of skimmed milk, highly refined coconut oil and vitamins A and D over into a homogenizer 9; and as we do so after opening up valve 10, this emulsion passes through pump 11 up through pipe 12 and a major portion of its passes through valve 13 and pipe 14 over into the homogenizer 9.

At point 15, however, a portion of this emulsion that is being pumped is permitted to return through valve 16 and pipe 8 to the vacuum tank 2 in order thus to furnish a carrier for the vitamin A and D concentrate coming from the graduated container 6.

It will be noted that at point 15 in pipe 12, we connect a cup 17 therewith through a communicative pipe 18 having a shut-off valve 19; and this cup is provided as a means of testing the density of the emulsion as it is being pumped over into the homogenizer 9.

In connection with our process, we provide the homogenizer 9 for the purpose of more completely mixing and further breaking up the ingredients in the emulsion.

This homogenizer has a pump 20 and a series of relatively small passages 21 through which the emulsion which is pumped to it through pipes 12 and 14 is forcefully pumped at relatively high pressure by pump 20.

This operation of running the emulsion through homogenizer 9 very successfully breaks up any fine particles of the emulsion and thoroughly completes a mixture of any food ingredients therein so that such fine particles are thoroughly homogenized to the extent that they are held in permanent inseparable suspension.

After thus completing the process of emulsifying the wholesome food ingredients in our milk product, we then prefer to cool the product by running the emulsion over a series of cooling coils after which our food product, resulting from our novel process is canned, sealed, sterilized, labeled and packed for shipment or storage.

It will be observed that in our process of manufacturing this new milk food product that when we enter the vitamin A and D concentrate into the agitating emulsion in the vacuum tank we are solving a problem which it was not possible to solve in any other way that we have tried.

For instance, when we tried entering the vitamin A and D concentrate to the open hot wells, we found the result to be too great a loss of the vitamins; on the other hand, when we tried entering the vitamins into the emulsion after it leaves the vacuum tank and before it enters the homogenizer, we then found it impossible to eliminate unpleasant odors and an unpleasant taste, which are commonly found in high potency vitamin A and D concentrates.

We therefore decided that by entering vitamin A and D concentrate into the agitating emulsion within the vacuum tank, we not only successfully mix these vitamins with the emulsion, thoroughly, while the agitation in the vacuum tank at a temperature of approximately 130° F. is driving off a desired amount of water in concentrating this mixture but we are thus able to add these vitamins under conditions which will positively insure a milk product from our process which will not retain any of the unpleasant odors and unpleasant tastes which are commonly known to exist in high potency vitamin concentrates.

To those who are familiar with the business of preparing milk food products for the market, it will be understood that the purpose of our adding vitamins A and D to the emulsion is to supply, at least, the quantity of vitamin content commonly found in whole milk and more than is often found in whole milk, and to supply such vitamins to our milk food product in a manner and under conditions of preparation such as will insure no losses of the vitamins during the preparation of our product as well as to insure that the vitamins are added and prepared in the emulsion under most favorable conditions for providing a dependable and uniform quantity of vitamin content; whereas the vitamin content in whole and evaporated milk is uncertain and not dependable, since the vitamin found in whole milk depends upon the season of the year and upon the feed the cow gets.

Having thus described the nature of our process of preparing milk food products, what we claim is:

1. A process of manufacturing filled milk of high vitamin content comprising agitating a liquid containing skimmed milk and vegetable oil at a temperature of about 210° F., and then agitating the mixture under vacuum at a temperature of about 130° F. to create bubbles within the mix and to withdraw vapor from the mix and during this agitation introducing vitamin A and D concentrate for distribution throughout the oleaginous particles.

2. A process of manufacturing filled milk of high vitamin content comprising agitating a liquid containing skimmed milk and vegetable oil at a temperature of about 210° F., and then agitating the mixture under vacuum at a temperature of about 130° F. to create bubbles within the mix and to withdraw vapor from the mix and during this agitation introducing vitamin A and D concentrate for distribution throughout the oleaginous particles, then homogenizing the mixture to divide the emulsified particles and to stabilize the emulsion.

3. A process of manufacturing filled milk of high vitamin content comprising agitating a liquid containing vegetable oil and skimmed milk with steam to a temperature of approximately 210° F. to effect preliminary distribution and then applying vacuum to the mixture to effect violent agitation and removal of vapor from the mix, this vacuum treatment being effected at about 130° F., and during this vacuum agitation introducing concentrate of vitamin A and D for distribution in the oil particles at about 130° F.

4. A process of manufacturing filled milk of high vitamin content comprising agitating a liquid containing vegetable oil and skimmed milk with steam to a temperature of approximately 210° F. to effect preliminary distribution and then releasing the mixture into a vacuum to effect violent agitation and removal of vapor from the mix, this vacuum treatment being effected at about 130° F. and during this vacuum agitation introducing concentrate of vitamin A and D for distribution in the oil particles at about 130° F. and withdrawing the agitated liquid for homogenization, recirculating a portion of the withdrawn liquid and adding concentrate of vitamin A and D to the recirculating portion of the emulsion.

5. A process of manufacturing filled milk of high vitamin content comprising agitating a liquid containing skimmed milk and vegetable oil at a temperature of about 210° F. and then agitating the mixture under vacuum at a temperature of about 130° F. to create bubbles within the mix and to withdraw vapor from the mix, the agitation under vacuum being in a vacuum of approximately twenty-six inches, and during vacuum agitation introducing vitamin A and D concentrate for distribution throughout the oleaginous particles.

CHARLES G. HAUSER.
HENRY OTTO BIERBAUM.
HARRY J. MILLER.